United States Patent

[11] 3,524,383

| [72] | Inventor | Charles H. Locke<br>4 Park St., Wappingers Falls, New York 12590 |
|---|---|---|
| [21] | Appl. No. | 847,862 |
| [22] | Filed | Aug. 6, 1969<br>Division of Ser. No. 585,542, filed Oct. 10, 1966. |
| [45] | Patented | Aug. 18, 1970 |

[54] PNEUMATIC ACTUATOR
10 Claims, 4 Drawing Figs.

[52] U.S. Cl................................................ 91/35,
222/504, 91/189
[51] Int. Cl..................................................... F15b 21/02
[50] Field of Search........................................... 91/35, 189,
393; 222/334, 477, 504; 415/51; 137/624.11

[56] References Cited
UNITED STATES PATENTS

| 745,811 | 12/1903 | Fritsche.................... | 222/477X |
| 2,084,562 | 6/1937 | Schafer..................... | 91/393X |
| 2,375,946 | 5/1945 | Reichelt..................... | 91/35X |
| 2,721,008 | 10/1955 | Morgan..................... | 222/334 |
| 2,997,271 | 8/1961 | Bounds..................... | 222/477X |
| 3,231,136 | 1/1966 | Rotter et al................. | 222/334X |
| 3,262,374 | 7/1966 | Trombatore et al......... | 91/35X |

*Primary Examiner*— Everette A. Powell, Jr.
*Attorney*— Hanifin Jancin and Wolman J. Stoffel

ABSTRACT: A control having a power means to actuate an element to be controlled, a timing cylinder and piston, a valve for establishing active communication between the cylinder and piston and a source of differential fluid pressure, a first sensor responsive to a first position of the piston during a timing stroke to actuate the power means, and the second sensor responsive to a later position of the piston during the timing stroke to de-activate the power means.

Patented Aug. 18, 1970

3,524,383

INVENTOR
CHARLES H. LOCKE

BY Wolmar J. Stoffel
ATTORNEY

PNEUMATIC ACTUATOR

SPECIFICATION

This is a division of application Serial No. 585,542 filed October 10, 1966.

This invention relates to means for dispensing fluids, more particularly to a combination of controller and a slide valve, having a plurality of outlets adapted to simultaneously and accurately dispense fluids to a plurality of spaced locations.

In modern mass production systems, there is frequently a need for dispensing fluids simultaneously to a number of spaced locations. Typical examples of such applications include the filling of capsules, cans, or other containers, the food industry, the molding industry where a number of small molds are simultaneously filled, and the sealing of and encapsulation of electronic components. Usually a number of elements are simultaneously presented in trays, etc. to dispense station for receiving of or the application of the fluid, such as paint, molding material, encapsulating material, confectionery sugar or other eatable material, etc.

Dispense systems with a plurality of outlets for simultaneously dispensing fluids are known. Such systems may include a plurality of individual rotary or other type valves having a common actuating means. The amount of fluid dispensed is controlled by the length of time the valve is held open, usually by some mechanical timing device. Such dispense systems have a number of shortcomings. The overall valve, consisting of a number of individual valves, is intricate, expensive, and vulnerable to wear, and frequently difficult to remain in balance so that equal amounts are dispensed through all openings. The valves are normally too hard to clean and service. Further, the dispensing of various materials that are injurious to seals etc. presents formidable servicing problems, and frequently such dispensing is not practical. Still further, such valves are normally not adapted for handling different fluids having widely different viscosities and other related physical characteristics. Also, known valve control mechanisms are not adapted to activate the valve to control the length of time that the valve is in open position to the precision required to dispense fluids in uniform and precise amounts.

Slide valves, more particularly slide valves having a plurality of openings, are known. The known slide valves have not proven entirely satisfactory in the dispense systems utilizing a plurality of outlet openings. Such valves necessarily are provided with a relatively long slidable gate element having apertures that can be put into and out of registration with an associated set of apertures, in turn communicating with a reservoir or pressurized source of fluid. Providing and maintaining a seal between the contacting surfaces of the respective set of apertures is very difficult and presents major maintenance problems. A large force must be applied to maintain the contacting surfaces in sealing engagement, which causes rapid wear and requires a large force to operate the valve. Further, adjusting the relative rates of fluid flow through the individual openings or apertures is not normally possible.

In general, the multiple outlet valves known to the prior art have not proven satisfactory in dispense systems for simultaneously dispensing fluid through a number of openings because they present serious maintenance problems, are not adapted to handle fluids of varying physical characteristics, and do not provide a suitable means to vary the relative flow through the individual openings.

An object of this invention is to provide improved fluid dispensing apparatus.

Another object of this invention is to provide an improved valve and valve actuator combination adapted to dispense fluid in precise measured amounts and in hazardous locations.

Yet another object of this invention is to provide an improved dispensing valve actuator adapted to manipulate a valve in precisely timed cycles.

Another object of the invention is providing a valve actuator in which the time interval is initiated while the timing element is in motion.

The dispensing system of the invention has a dispensing valve in combination with a control for the valve. The control has a power means for opening and closing the dispensing valve, a timing cylinder and piston, and a source of differential gas pressure operatively communicating with the cylinder and piston.

Valve means are provided for establishing active fluid communication between the cylinder and piston and the source of differential pressure to thereby initiate a timing stroke. The timing interval is measured by a first sensing means which is responsive to a first position of the piston during the timing stroke, and a second sensing means responsive to a later position of the piston during the timing stroke. The first sensing means causes the power means to open the dispensing valve and the second sensing means causes the power means to close the valve. Preferably, there is provided a means to control the rate of flow of gas to the timing cylinder and piston from the source of differential gas pressure which is adapted to vary the timing stroke interval.

The multiple outlet valve of the invention has a gate means with a plurality of ports and a plurality of valve pads, with each pad passage adapted to communicate with a source of fluid. Means are provided for supporting the valve pads and gate means in relatively slidable relation. A means is provided for biasing the valve pads into sealing contact with the gate means.

The dispensing system of the invention makes possible precise dispensing of fluid, and in particular dispensing of precise amounts of fluid through a plurality of ports. Accurate dispensing of the fluid is made possible by the valve actuator which measures the time interval of a timing stroke of a cylinder and piston after the piston is set in motion. The length of the time interval can be adjusted by adjusting the rate of gas flow to and/or from the cylinder, or by positioning the sensing means at different locations to sense a smaller or larger portion of the timing stroke of the cylinder and piston. With this arrangement, the length of the timing interval is maintained uniform. Sense variations of the stroke due to static friction, variation in the forces necessary to overcome the inertia of the piston and the associated apparatus are eliminated. Further, the pneumatically controlled dispensing valve actuator eliminates hazards due to fire, explosion, etc. when the fluid being dispensed is flammable.

The foregoing objects, features and advantages of the invention will be apparent from the particular description of a preferred embodiment of the invention, shown in the accompanying drawings.

Figure 1:
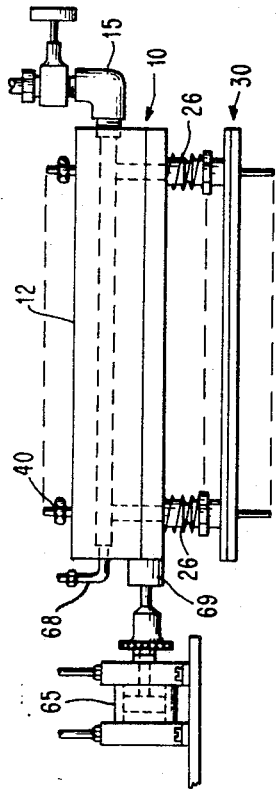
FIG. 1 is a front elevational view of the multiple outlet valve of the invention in combination with an actuating means, shown with parts of the valve removed for simplicity of illustration.
Figure 2:
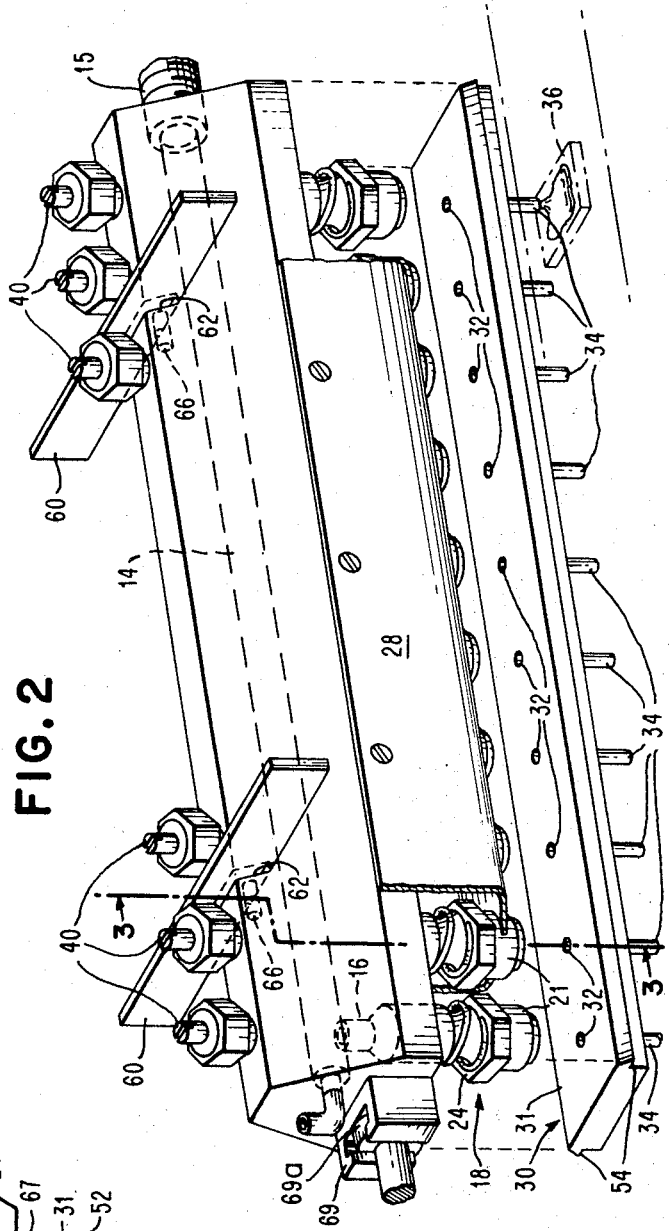
FIG. 2 is a perspective view in partially broken section of the multiple valve of the invention shown with some of the parts in exploded relation, and a number of parts removed to facilitate illustration thereof.
Figure 3:
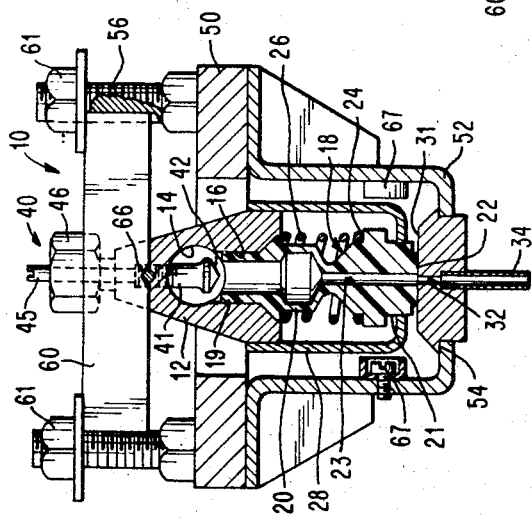
FIG. 3 is a sectional view taken on line 3-3 of FIG. 2.

Referring now to the drawings, there is depicted in FIGS. 1-3 a preferred specific embodiment 10 of the multiple outlet valve of the invention. The valve 10 has a manifold 12 provided with a longitudinally extending cavity 14 which communicates with a source of fluid to be dispensed. The source of fluid (not shown) is conveyed to the passage 14 through a suitable conduit 15, which is preferably provided with a flexible portion to allow longitudinal movement of the manifold. A plurality of threaded openings 16 are provided in manifold 12 and which communicate with cavity 14, as most clearly shown in FIG. 3.

Mounted in threaded openings 16 are a plurality of resilient pads 18. Each of pads 18 has a threaded portion 19, a bellows portion 20, a shank 21, and annular planar end surface 22 which is centered about the outlet of passage 23. The valve pads 18 are made of a resilient material, preferably a plastic, still more preferably polytetrafluoroethylene. The material of the valve pads should be resilient and also be inert to the fluid to be dispensed. Diaphragm portion 20 of the pad allows a limited longitudinal compression of the pad. Pad 18 is also provided with an annular abutment 24 and a compression spring 26 as most clearly shown in FIG. 3. Spring 26 biases the end of the valve pad 18 outwardly. The pads are mounted in a housing 28, which is mounted on manifold 12. As most clearly illustrated in FIG. 3, the housing 28 is provided with a plurality of apertures which receive shank portion 21. The housing maintains the valve pads in a predetermined arrangement and allows limited longitudinal movement of the end of the pad.

A valve gate 30 consists of an elongated plate with a flat planar surface 31, and a plurality of valve ports 32 adapted to be placed in registration with the outlet openings of pads 18. Tubular spouts 34 are provided which communicate with the valve port 32. As indicated in FIG. 2, the spouts 34 are useful for conveying material to be dispensed to the precise area desired, as for example the top surface of a module 36. If desired, a plurality of spouts 32 can be provided which communicate with a single valve port.

In order to adjust the relative rates of flow through the valve openings, a throttle mechanism is provided. the throttle mechanism is most clearly illustrated in FIG. 3 and consists of a throttle valve 40 having a threaded portion 41, a conical valve surface 42 and a shank 44 with a slot 45. As indicated, the conical valve surface 42 is arranged in close proximity to the upper end of the passage in valve pad 18. The passage opening in the individual pads can thus be varied by shifting the valve element 40, to compensate for structural variations of the pad, fluid friction losses, within passage 14 etc. A locknut 46 is threadedly mounted in manifold 12 and an annular seal, which combination prevents fluid from leaking out of the manifold and also serves as a lock for maintaining the adjusted position of valve 40. The manifold 12 and its associated elements and valve gate 30 are supported for relative movement to allow passages 23 of valve pads 18 to be moved into and out of registration with valve ports 32 on gate 30. The support providing such mode of operation has a base 50 having mounted thereon a valve gate clamp 52. As most clearly indicated in FIG. 3, clamp 52 engages an abutment 54 on gate 30. Abutments 67 are mounted on the inside of clamp 52 to aid in the centering of housing 28 and the associated manifold and pad assembly.

Mounted above base 50 is a plurality of bolts 56 arranged in pairs, with each bolt provided with a longitudinal slot 58. Flexible transverse bars 60 are mounted in the slots 58 in bolts 56 and secured therein by nuts 61. The bars 60 are mounted in slots 62 in manifold 30 as most clearly illustrated in FIG. 2. Pins 66 mounted in the bottom of slots 62 that are sealed in detents in bars 60 are provided to center the manifold relative to base 50. The pins 66 in combination with the planar surfaces 22 of the pads 18 provide a triangular support configuration for the manifold and pad assembly. Preferably, the bars 60 when in an unstressed position locate the manifold 12 in an intermediate position relative to gate 30.

FIG. 1 shows the combination of the valve 10 of the invention and a suitable actuating means. The actuating means can be pneumatically operated by cylinder 65, an electrical solenoid, or any other apparatus which will move the manifold and its associated elements into and out of registration with the valve ports in valve plate 30 for a precise time interval. The actuating means is coupled to the valve manifold 12 with a slotted element 69 which receives a head 69a. This coupling arrangement allows limited movement of the manifold in the direction of the longitudinal axis of passages 23 of pads 18.

Figure 4:
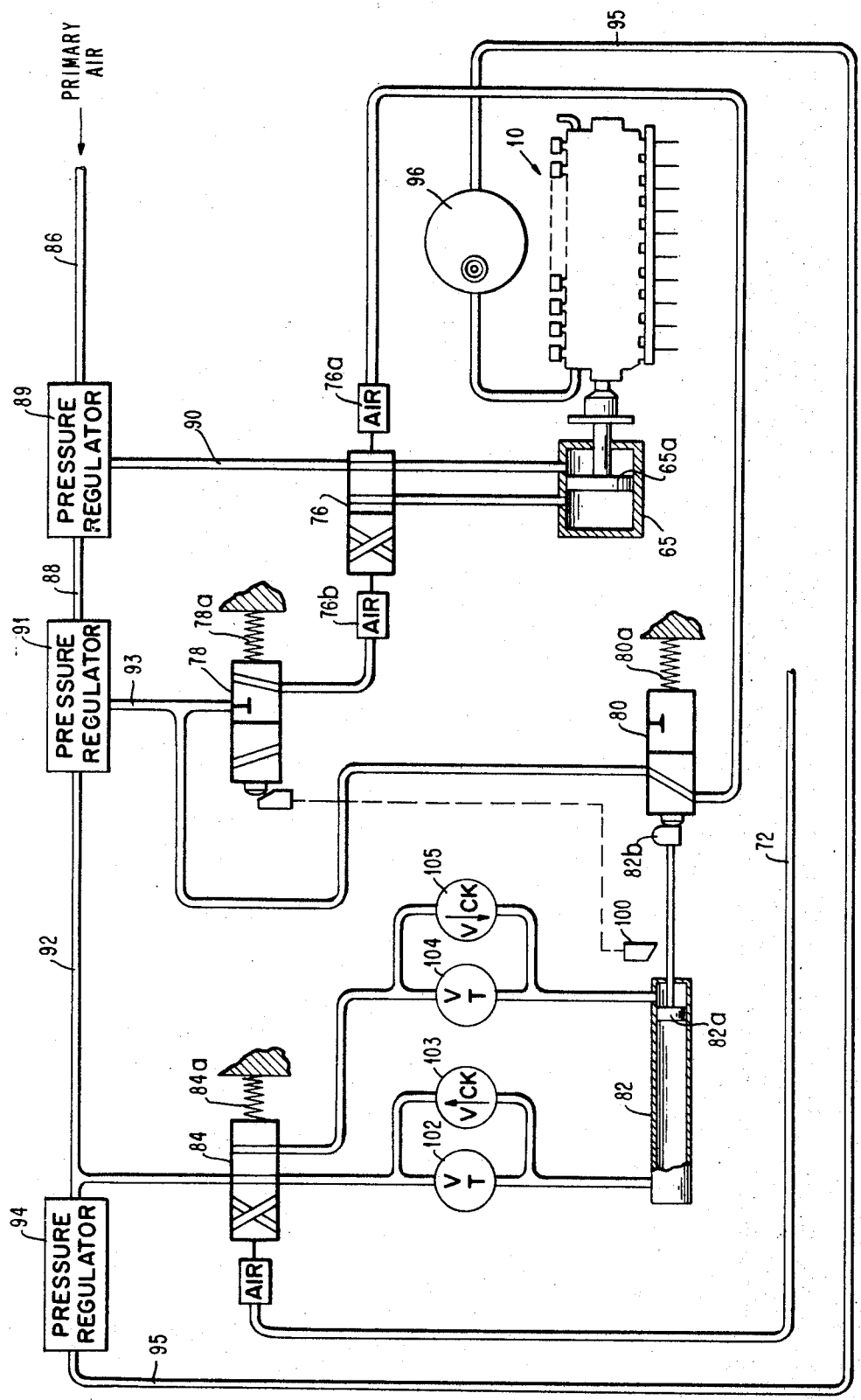
FIG. 4 is a schematic view of the multiple valve of the invention in combination with example of a suitable actuating means.

A preferred valve actuating control for valve 10 is illustrated in FIG. 4. The control 70 is pneumatically operated. An operative cycle of control 70 is induced by an air pulse introduced through conduit 72.

Control 70 has a double acting air cylinder 65 operatively connected to the manifold of multiple valve 10. Actuation of cylinder 65 is controlled by a four-way double pilot pressure operated valve 76, in turn controlled by pilot actuation cam operated spring return valves 78 and 80. Valves 78 and 80 are actuated by the double acting air cylinder 82, which serves as the timing element for determining the precise time interval that multiple outlet valve 10 is maintained in the open position. Cylinder 82 is actuated by four-way pilot pressure operated spring return valve 84, in turn actuated by a timing pulse introduced into conduit 72 by the overall control system in which the control 70 is embodied. The control 70 is operated by a secondary pilot air system wherein air is introduced into conduit 86. The air introduced into conduit 86 is regulated by pressure regulator 89 to a constant value of 60 pounds per square inch in conduits 88 and 90. The pressure in conduit 88 enters pressure regulator 91 where it is regulated to 45 pounds per square inch in conduits 92 and 93. Pressure regulator 94 controls the air pressure in conduit 95 which is connected to a fluid reservoir 96 communicating with the interior of multiple outlet valve 10. Fluid being dispensed is stored in reservoir 96 under a constant pressure controlled by pressure regulator 94.

In the operation of control 70, in absence of an air pulse in conduit 72, valve 84 is biased by spring 84A so that air under pressure is introduced into cylinder 82 to urge the piston 82A in the position illustrated in the drawing. A charge pulse of air introduced into conduit 72 shifts the valve 84 overcoming spring 84A to introduce air under pressure to the opposite side of piston 82A and drive same to the left as viewed in the drawing. This portion of the cylinder cycle is termed the charge stroke. Upon termination of the charge pulse spring 84A returns valve 84 to its initial position beginning the timing stroke of cylinder 82. During the initial half of the charge stroke of cylinder 82, the cam actuator 82B releases pressure on valve 80 allowing the spring 80A to shift the valve. Cam actuator 82 passes the cam 100 on this portion of the cycle without actuating same since the cam is a one-way cam. The shifting of valve 80 disconnects pilot 76A from the source of air. However the valve 76 is not shifted since there is no pressure on the opposite pilot 76B.

When the charge pulse introduced into conduit 72 is terminated and valve 84 shifts back to its initial position as shown in FIG. 4 of the drawing, air in conduit 92 under pressure forces the piston 82A to the right into what is termed the timing stroke. The flow of air to and from cylinder 82 is controlled by throttle valves 102 and 104. Adjustment of valves 102 and 104 and adjustment of the pressure in conduit 92 control the time that it takes piston 82 to travel from one end to the other end of cylinder 82. Check valves 103 and 105 provide unrestricted flow of air to and from cylinder 82 during the charge stroke. One-way cam follower 100 is positioned so that the cam follower 82B strikes same while the cam follower is in motion. Very precise control of the timing stroke of the cycle is possible since the static friction, and inertial forces necessary to overcome the inertia of the piston have overcome prior to striking cam follower 100.

The actuation of cam follower 100 by cam actuator 82 in turn actuates valve 78 in opposition to spring 78A. Air pressure is then introduced to pilot 76B which shifts valve 76 and applying air under pressure from conduit 90 to the left side of piston 65A in turn forcing the manifold of multiple outlet valve 10 to the right as viewed in FIG. 4 and opening the valve ports. Multiple outlet valve 10 is maintained in the open position until the cam actuator 82B opens valve 80 and compressing spring 80A to introduce air to pilot 76A forcing valve 76 to the left and reversing air cylinder 65 and closing multiple outlet valve 10.

While the invention has been particularly shown and described with reference to a preferred specific embodiment thereof, it will be understood by those skilled in the art that various changes in form and detail may be made therein without departing from the spirit and scope of the invention.

I claim:
1. A dispensing system comprising:
    a dispensing valve,
    a control for said valve, said control having a power means for opening and closing said dispensing valve,
    a timing cylinder and piston,
    a source of differential gas pressure operatively communicating with said cylinder and piston,
    valve means for establishing active communication between said cylinder and piston and said source of differential gas pressure to thereby initiate a timing stroke,
    first sensing means responsive to a first position of said piston during said timing stroke to cause said power means to open said valve, and
    second sensing means responsive to a later position of said piston during said timing stroke to cause said power means to close said valve.
2. The dispensing system of Claim 1 wherein,
    said first sensing means is positioned to be actuated after the timing stroke of said cylinder and piston has commenced and the piston is in motion.
3. The dispensing system of Claim 2 wherein said second sensing means is positioned to be actuated by said cylinder and piston at the termination of said timing stroke, the interval determined by said first and second sensing means being less than the stroke interval of said cylinder and piston.
4. The dispensing system of Claim 1 wherein said first sensing means is a one-way cam positioned intermediate the end limits of the stroke of said piston, which cam activates a first valve means adapted to cause said power means to open said dispensing valve.
5. The dispensing system of Claim 4 wherein said second sensing means is a second valve means actuated by movement of said piston adapted to cause said power means to close said dispensing valve.
6. The dispensing system of Claim 1 wherein there is provided a means to control the rate of flow to said timing cylinder and piston from said source of differential gas pressure, said last mentioned means adapted to vary the timing stroke interval.
7. A pneumatic control comprising,
    a power means adapted to actuate an element to be controlled,
    a timing cylinder and piston,
    a source of differential gas pressure operatively communicating with said cylinder and piston,
    valve means for establishing active communication between said cylinder and piston and said source of differential gas pressure to thereby initiate a timing stroke,
    first sensing means responsive to a first position of said piston during said timing stroke to activate said power means,
    and second sensing means responsive to a later position of said piston during said timing stroke to deactivate said power means.
8. The control of Claim 7 wherein,
    said first sensing means is positioned to be actuated after the timing stroke of said cylinder and piston has commenced and the piston is in motion.
9. The control of Claim 8 wherein said second sensing means is positioned to be actuated by said cylinder and piston at the termination of said timing stroke,
    the interval determined by said first and second sensing means using less than the stroke interval of said cylinder and piston.
10. The control of Claim 9 wherein,
    said power means is pneumatically operated,
    a four-way double pilot pneumatically operated valve controls flow of gas to said power means.
    said first sensing means includes a first spring return valve controlling gas flow to one of the pilots of said four-way valve, and
    said second sensing means includes a second spring return valve controlling gas flow to the other pilot of said four-way valve.